United States Patent [19]

Santa

[11] Patent Number: 4,668,136

[45] Date of Patent: May 26, 1987

[54] WELDING ELECTRODE DRESSING DEVICE

[76] Inventor: Stephen Santa, 23365 Detroit Rd., Westlake, Ohio 44145

[21] Appl. No.: 801,219

[22] Filed: Nov. 25, 1985

[51] Int. Cl.[4] ................................................ B23C 1/20
[52] U.S. Cl. ................................... 409/181; 51/73 R; 219/119
[58] Field of Search ......................... 219/119; 173/163; 51/73 R; 409/181, 182, 189

[56] References Cited

U.S. PATENT DOCUMENTS 3,532,026 10/1970 Mayer .............................. 409/189 X

FOREIGN PATENT DOCUMENTS 60-3907 1/1985 Japan .................................... 219/119
60-50551 11/1985 Japan .................................... 219/119

Primary Examiner—E. R. Kazenda
Assistant Examiner—John L. Knoble
Attorney, Agent, or Firm—James A. Hudak

[57] ABSTRACT

A device for "dressing" welding electrode tips is disclosed. The device utilizes an integrally formed air motor, retained within a housing member, to drive a gear train which rotates the welding tip cutters. The air motor is actuated by relative longitudinal movement, in either direction, between the housing member and a carriage member which acts as the base for the device. The longitudinal axis of the air motor is parallel to the direction of travel of the housing member with respect to the carriage member thus eliminating the need for bevel gears in the gear train.

4 Claims, 5 Drawing Figures

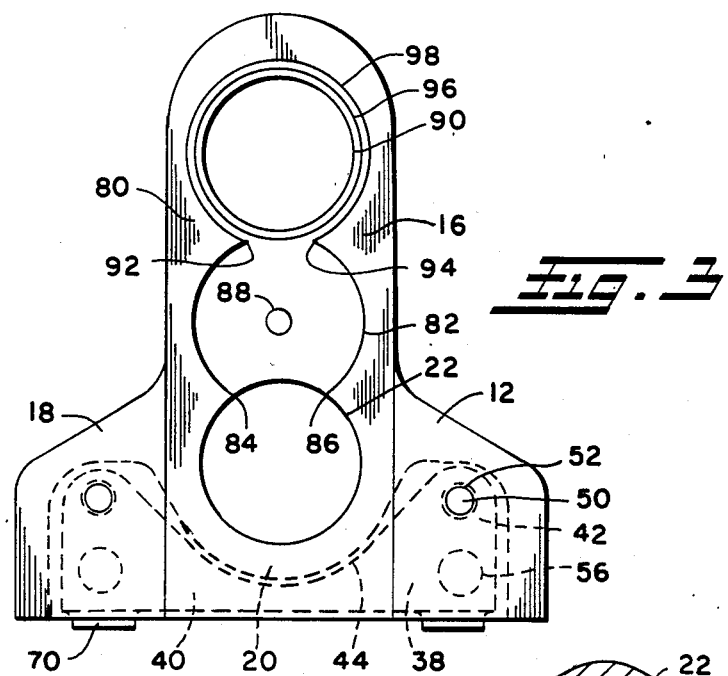
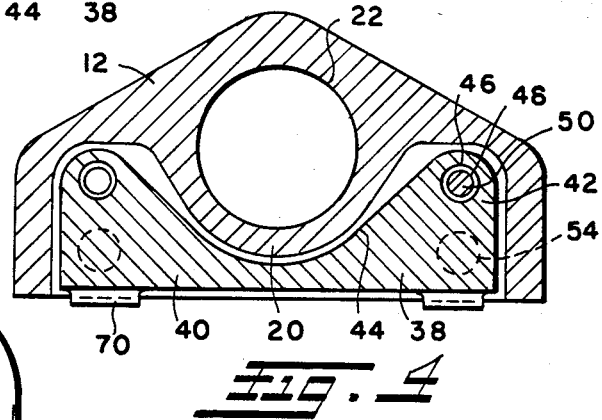
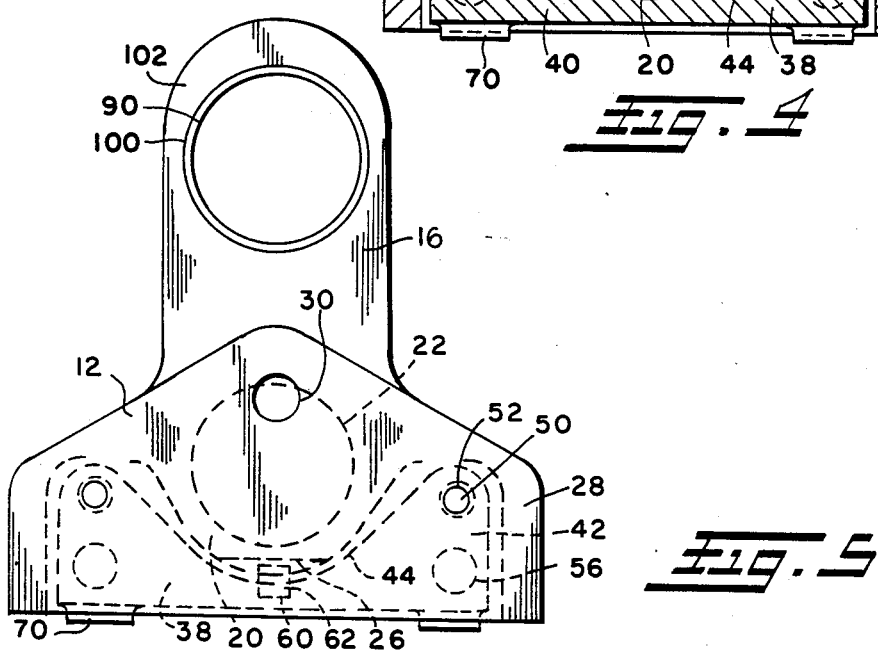

WELDING ELECTRODE DRESSING DEVICE

TECHNICAL FIELD

This invention generally relates to a device for "dressing" welding electrode tips and more particularly to a "dressing" device wherein the air motor is an integral part of same.

BACKGROUND ART

Numerous devices are available for "dressing" welding electrode tips particularly in view of the increase in robotic welding. For example, one type of electrode "dressing" device utilizes an air motor which is attached to a mounting member, both of which are contained within a housing. The housing can move laterally with respect to the mounting member and the air motor, and such relative lateral movement causes the actuation of the air motor which, in turn, drives the welding tip cutters. Another type of "dressing" device utilizes a stationary housing, and the mounting member, which is attached to the air motor, is allowed to move laterally with respect to the housing. Here again, such relative lateral movement between the housing and the mounting member causes the actuation of the air motor and the rotation of the welding tip cutters. In either case, the air motor is not integrally formed to the mounting member or the housing and thus can be easily removed from the device. It has been found that this ease of removal encourages theft of the air motor which has been a serious problem, particularly in industrial applications. In addition, in the foregoing types of "dressing" devices, the longitudinal axis of the air motor is perpendicular to the direction of travel of the housing or the mounting member, depending on which of these components moves relative to the other. In any event, this perpendicular orientation necessitates the use of a bevel gear arrangement on the output shaft of the air motor so that the welding tip cutters are parallel to the direction of travel of the housing with respect to the mounting member, or vice versa. Such parallelism is required for the proper operation of the "dressing" device. It has been found that such bevel gears are subject to shock loading, etc resulting in fatigue and premature gear failure.

Because of the foregoing, it has become desirable to develop an electrode "dressing" device wherein the air motor is integrally formed within the device and which does not require bevel gears in the output gear train that drives the welding tip cutters.

SUMMARY OF THE INVENTION

The present invention solves the aforementioned problems associated with the prior art devices as well as other problems by providing an electrode "dressing" device wherein the air motor is integrally formed therein and cannot be removed without disassembling a portion of the device. The air motor is positioned within the housing for the device so as to be parallel to the direction of travel of the housing with respect to a carriage member which is firmly attached to a support surface. The carriage member is supported by rail members within the housing permitting the longitudinal movement of the housing with respect to the carriage member. The carriage member is "self-centered" within the housing and relative longitudinal movement in either direction with respect to the housing causes the actuation of the air motor. A gear train is attached to the output shaft of the air motor to drive the welding tip cutters attached thereto. Inasmuch as the longitudinal axis of the air motor is parallel to the direction of travel of the housing with respect to the carriage member, bevel gears in the output gear train are not required.

BRIEF DESCRIPTION OF THE DRAWINGS

FIG. 3 is an end view of the present invention as viewed from the left of FIG. 2.

FIG. 4 is a cross-sectional view of the present invention as taken along section-indicating lines 4—4 of FIG. 1.

FIG. 5 is an end view of the present invention as viewed from the right of FIG. 2.

DESCRIPTION OF THE PREFERRED EMBODIMENT

Figure 1:
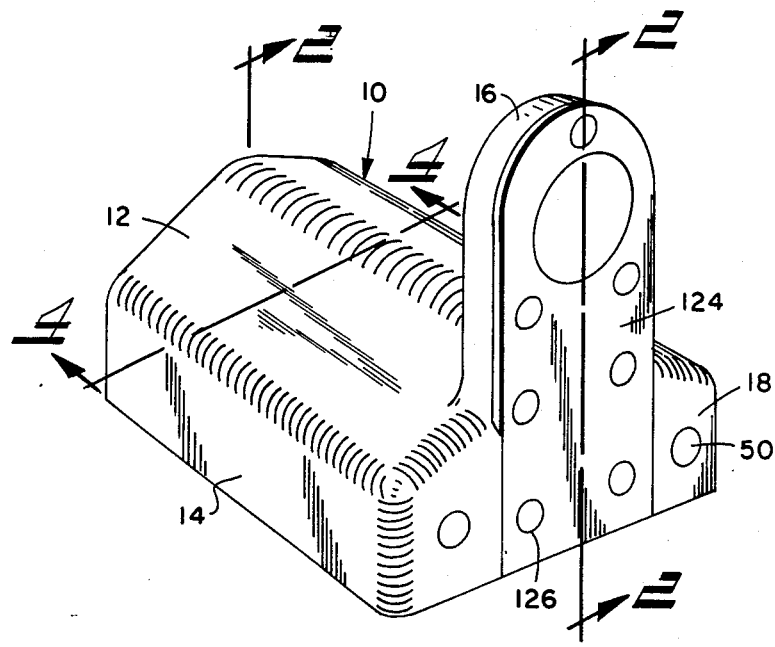
FIG. 1 is a perspective view of the present invention.

Referring now to the drawings where the illustrations are for the purpose of describing the preferred embodiment of the present invention and are not intended to limit the invention hereto, FIG. 1 is a perspective view of a welding electrode dressing device 10 which is air operated and ideally suited for "dressing38 welding tips utilized by robotic welders.

Figure 2:
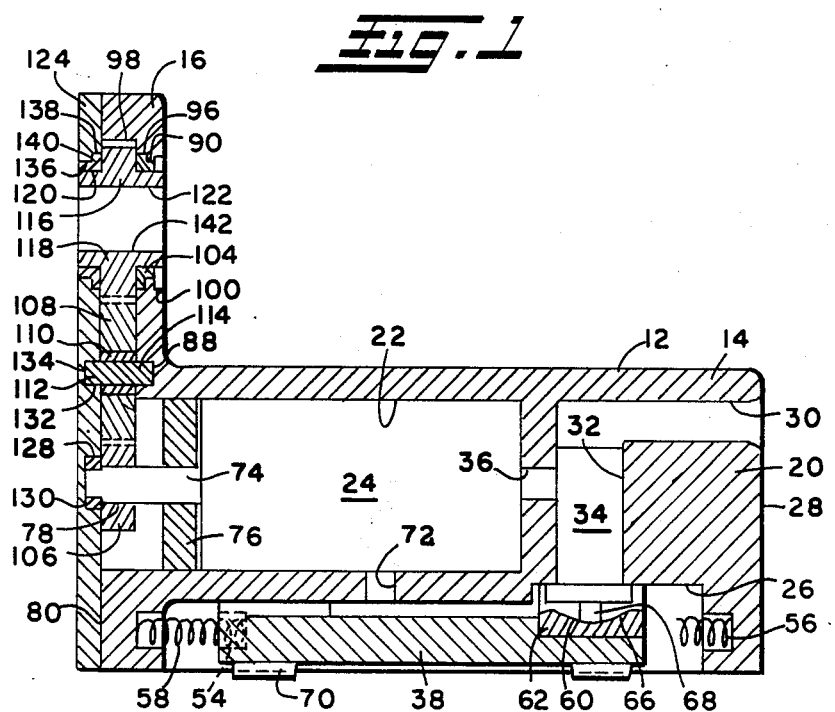
FIG. 2 is a cross-sectional view of the present invention as taken along section-indicating lines 2—2 of FIG. 1.

The dressing device 10 is contained within a housing 12 comprised of a longitudinally extending portion 14 and an upright portion 16 located at one end 18 thereof. The housing 12 is typically produced as an aluminum casting, however, other methods of fabrication can be utilized The housing 12 includes a generally centrally located land portion 20, as shown in FIG. 2. The land portion 20 extends longitudinally for the entire length of the housing 12, and the bottom surface of the land portion 20 has a semi-circular configuration, in cross-section, as shown in FIG. 4. A blind bore 22 is provided in the land portion 20 and is positioned so that the opening thereto is located in the upright portion 16 of the housing 12. The diameter and depth of the blind bore 22 are sufficient to receive an air motor 24, hereinafter described. A flat surface 26 is provided on the bottom of the land portion 20 adjacent the end 28 of the housing 12 that is opposite the end 18 containing the upright portion 16 thereof. A threaded blind bore 30 is provided in the end 28 of the housing 12 adjacent the top surface thereof so as to be located in the centrally located land portion 20 of the housing 12. The threaded blind bore 30 acts as the air inlet port to the housing 12 and, as such, its diameter is sufficient to threadably receive a connector on an air supply line. A blind bore 32 is provided in the land portion 20 of the housing 12 and terminates in the threaded blind bore 30. The blind bore 32 is positioned so that the opening thereto is located in the flat surface 26 provided on the bottom of the centrally located land portion 20 of the housing 12 and is oriented so that its axis is substantially perpendicular to the axis of the threaded blind bore 30. The blind bore 32 is sized so as to receive a poppet-type air valve 34 and may be threaded if the air valve 34 is provided with threads on the outer surface thereof. An aperture 36 is provided in the wall of the blind bore 32 adjacent the end of the blind bore 22, which receives the air motor, and is oriented so as to be aligned with the outlet of the air valve 34. Thus, an air passageway is provided to the air motor via the threaded blind bore 30, air valve 34 and aperture 36, and the air valve 34 can control the operation of the air motor by regulating the flow of air thereto from an air supply (not shown) connected to the threaded blind bore 30.

A carriage member 38 having a generally rectangular configuration is located under the centrally located land portion 20 of the housing 12 and is movable with respect to the longitudinal axis thereof. The carriage member is comprised of a rectangular base 40 with an upwardly directed ear 42 adjacent each corner defining its rectangular shape, and is typically produced as an aluminum casting. The ears 42 are shaped such that the surface 44 that is adjacent the centrally located land portion 20 has a configuration complementary to that of the land portion 20 permitting the longitudinal movement of the carriage member 38 with respect to the housing 12. An aperture 46 is provided in each of the ears 42 and is positioned so that the apertures 46 in the ears 42 along each of the longer sides of the carriage member 38 are aligned. A linear bearing 48 is press fit into each of the apertures 46, the axial length of each of the bearings 48 being substantially equal to the thickness of the ear 42 into which it is received. A round rail member 50 is received through the bearings 48 located in the aligned apertures 46 in the ears 42 along each of the longer sides of the carriage member 38. The diameter of the rail member 50 is such that the outer surface defining same slidingly engages the inner surface of the bearings 48. A pair of apertures 52 is provided in each end 18, 28 of the housing 12 and are sized to receive and retain a rail member 50. The apertures 52 are positioned so that each pair of oppositely disposed apertures 52 adjacent each of the longer sides of the longitudinally extending portion 14 of the housing 12 are aligned. A rail member 50 is received in each of the foregoing pairs of oppositely disposed aligned apertures 52 and is retained therein by a relatively tight slip fit arrangement. In this manner, the carriage member 38 can move longitudinally with respect to the housing 12 and is supported and guided in such movement by means of the rail members 50. A blind bore 54 is provided in each ear 42 adjacent the shorter side of the carriage member 38. The blind bores 54 are aligned substantially vertically with the apertures 46 provided in the ears 42 and are located beneath the apertures 46. A pair of blind bores 56 is provided on the inner surface of each end 18, 28 of the housing 12 and positioned so as to be aligned with the adjacent blind bores 54 in the carriage member 38. The diameter of the blind bores 54, 56 is such so as to be able to receive a compression spring 58, the ends of which are captured by each pair of aligned blind bores 54, 56. The compression springs 58 have identical length and physical properties causing the carriage member 38 to assume a position normally in the center of the longitudinally extending portion 14 of the housing 12. It should be noted that threaded through bores may be substituted for the blind bores 56 in the end 28 of the housing 12. Each of such threaded through bores would contain a threaded plug for a portion of its depth so that the compression springs 58 adjacent the end 28 of the housing 12 could be removed by removal of the threaded plug. The removal of the foregoing compression springs 58 is desirable under certain operating conditions, hereinafter described. A recess 60 is provided on the top surface of the rectangular base 40 of the carriage member 38 adjacent the shorter side of the carriage member 38 that is adjacent end 28 of the housing 12. A section of key stock 62 is received in the recess 60 and is attached to the rectangular base 40 by means of screws or other appropriate fastening means. The top surface of the key stock 62 is formed with a curved recess 66 in the approximate longitudinal center thereof. The key stock is positioned within the recess 60 so that the center of the curved recess 66 contacts the actuating tip 68 of the air valve 34 when the carriage member 38 is positioned in the center of the longitudinally extending portion 34 of the housing 12. In this manner, any longitudinal movement of the carriage member 38 with respect to the housing 12 causes the actuation tip 68 of the air valve 34 to traverse the surface of the curved recess resulting in the depression of the actuating tip 68 which opens the valve 34 allowing air from the air supply line to enter the air motor. A plurality of threaded bosses 70 are provided on the underside of the rectangular base 40 of the carriage member 38 and are utilized for the fastening of the base 40 to a supporting structure.

As previously stated, an air motor 24 is provided in the blind bore 22 located in the land portion 20 of the housing 12. The air motor 24 is of a standard design and is positioned within the blind bore 22 so that its inlet port is adjacent the aperture 36 which interconnects the blind bore 22 with the blind bore 32 containing the air valve. An exhaust port 72 interconnects the blind bore 22 with the outer surface of the land portion 20 of the housing 12. The air motor 24 is provided with an output shaft 74 which is substantially parallel to the base 40 of the carriage member 38 and protrudes outwardly from the blind bore 22 for a short distance. The output shaft is supported by a bearing 76 which is press fit into the entrance to the blind bore 22. A portion 78 of the end of the output shaft 74 is hexagonally shaped for attachment to a drive gear, hereinafter described.

The upright portion 16 of the housing 12 is milled for its entire height forming a substantially flat machined surface 80 thereon. A blind bore 82 is provided in the flat machined surface 80 and is positioned directly above the blind bore 22. The diameter of the blind bore 82 and its positioning is such that a portion of its circumference (an arc) intersects a portion of the circumference (an arc) of the blind bore 22, i.e., the blind bores 22, 82 intersect resulting in a figure 8 configuration with a common chord across points 84, 86. The diameter of the blind bore 82 is slightly greater than the diameter of the blind bore 22, and the depth of the blind bore 82 is sufficient to receive an idler gear, hereinafter described. A blind pilot hole 88 is provided centrally in the blind bore 82 to act as a journal surface for the aforementioned idler gear.

Similarly, a through bore 90 is provided in the flat machined surface 80 and is positioned directly above the blind bore 82. The diameter of the through bore 90 and its positioning relative to the blind bore 82 is such that a small portion of its circumference (an arc) intersects a small portion of the circumference (an arc) of the blind bore 82, i.e., the through bore 90 and the blind bore 82 intersection resulting in a figure 8 configuration with a common chord across points 92, 94. The diameter of the through bore 90 is slightly less than the diameter of the blind bores 82, 22. A first counterbore 96 and a second counterbore 98 are provided in the flat machined surface 80 and are concentric with the through bore 90. The diameter of the second counterbore 98 is slightly greater than the diameter of the first counterbore 96 and the depth of the second counterbore 98 is approximately the same as the depth of the blind bore 82. A third counterbore 100 is provided in surface 102 of the upright portion 16 of the housing 12. The third counterbore 100 is oppositely disposed from the first counterbore 96 and the second counterbore 98, and is also concentric with the through bore 90. A flanged bearing 104 is received within the through bore 90 and is positioned therein so that the outer surface of the sleeve portion thereof contacts the surface defining the through bore 90 while the outer surface of the flange portion thereof contacts the surfaces defining the first counterbore 96.

A drive gear 106 having a hexagonal opening therein is received on the hexagonally shaped 78 portion of the output shaft 74 of the air motor 24 so as to be contained substantially within blind bore 22. An idler gear 108 with a bearing 110 press fit therein is received on a pin 112, one end 114 of which is received within the blind pilot hole 88 provided in the blind bore 82. The thickness of the idler gear 108 is approximately the same as the depth of the blind bore 82 and its diameter is slightly less than the diameter of the blind bore 82, allowing the idler gear 108 to be contained substantially within the blind bore 82. The diameters, pitch and pressure angle of the drive gear 106 and the idler gear 108 are such so that these gears are in an intermeshing relationship when received within the blind bores 22, 82, respectively. A driven gear 116 having a central tooth portion 118 and journal surfaces 120, 122 oppositely disposed on either side of the central tooth portion 118 is received within the second counterbore 98 associated with the through bore 90. The thickness of the central tooth portion 118 of the driven gear 116 is approximately the same as the depth of the second counterbore 98, the diameter of this tooth portion 118 is slightly less than the diameter of the second counterbore 98, and the diameter of the journal surface 122 is slightly less than the inner diameter of the flanged bearing 104 permitting the journal surface 122 to be received therein and allowing the central tooth portion 118 of the driven gear 116 to be totally received within the second counterbore 98. The diameters pitch and pressure angle of the idler gear 108 and the driven gear 116 are such that these gears are in an intermeshing relationship when received within the blind bore 82 and the second counterbore 98, respectively. In this manner, an intermeshing gear train comprised of a drive gear 106, an idler gear 108 and a driven gear 116, connected to the output of the air motor 24, is provided. It should be noted that all of the foregoing gears are typically produced from a metallic material, such as 1141 steel.

A metallic cover plate 124 having the same configuration as the flat machined surface 80 is received over the machined surface 80 closing the end 18 of the housing 12. The cover plate 124 is attached to the flat machined surface 80 by a plurality of screws 126 or other appropriate fastening means. The thickness of the cover plate 124 is substantially the same as the milling depth which formed the flat machined surface 80 resulting in the outer surface of the cover plate 124, when installed, being substantially flush with the unmilled portion of the end 18 of the housing 12. A blind bore 128 is provided in the cover plate 124 adjacent to and aligned with the end of the output shaft 74 of the air motor 72. A sleeve bearing 130 is press fit into the blind bore 128 and receives the end of the output shaft 74 of the motor. In this manner, the drive gear 106 is rotatably supported by the bearings 76 and 130. A blind bore 132 is provided in the cover plate 124 adjacent to and aligned with the pin 112 on which idler gear 108 rotates. The end 134 of pin 112 is received within the blind bore 132 so that the idler gear 108 is rotatably supported on both ends 114, 134 of the pin 112. A through bore 136 is provided in the cover plate 124 adjacent to and aligned with the through bore 90 provided in the flat machined surface 80 of the housing 12. A counterbore 138 is provided in the through bore 136 and is positioned so as to be adjacent the inner surface of the cover plate 124. A flanged bearing 140 is received within the through bore 136 and is positioned therein so that the outer surface of the sleeve portion thereof contacts the surface defining the through bore 136 while the outer surface of the flange portion thereof contacts the surfaces defining the counterbore 138. The inner diameter of the bearing 140 is slightly greater than the diameter of the journal surface 120 to be received therein. In this manner, the driven gear 116 is rotatably supported on its journal surfaces 120, 122 by flanged bearings 140, 104 respectively. A bore 142 is provided through the center of the driven gear 116 and is sized to receive the welding tip cutters (not shown). The cutters are attached to the driven gear 116 and rotate as a unit with the driven gear 116.

Operationally, as the carriage member 38 moves longitudinally in either direction with respect to the center of the longitudinally extending portion 14 of the housing 12, the actuating tip 68 of the air valve 34 traverses the surface of the curved recess 66 in key stock 62 attached to the carriage member 38 causing the depression of the actuating tip 68 and the opening of the air valve 34. When the air valve 34 opens, air from the air supply is allowed to enter the air motor 24 via the threaded blind bore 30, air valve 34, and the aperture 36 causing the actuation of the motor 24. Actuation of the air motor 24 results in the rotation of the driven gear 116, and thus the welding tip cutters held therein, via the drive gear 106 and the idler gear 108. Thus, regardless of the direction of the longitudinal movement of the carriage member 38 with respect to the center of the longitudinally extending portion 14 of the housing 12, such longitudinal movement will cause the rotation of the driven gear 116 and the welding tip cutters held therein.

If the dressing device 10 is mounted vertically rather than horizontally so that the end 18 of the housing 12 is higher than the end 28 thereof, then the compression springs 58 that are retained in the bores 56 in the end 28 of the housing 12 can be removed by removing the threaded plugs previously referred to. Inasmuch as the dressing device 10 is mounted by attaching the base 40 of the carriage member 38 to a supporting surface and if the supporting surface is oriented vertically, the weight of the housing 12 will cause the housing 12 to move downwardly with respect to the carriage member 38 actuating the dressing device 10. If, however, the compression springs 58 that are retained in the bores 56 in the end 28 of the housing 12 are removed, thus eliminating the additional downward force created by these springs 58 on the housing 12, the housing 12 will assume a new "equilibrium position" whereby the carriage member 38 is located in the center of the longitudinally extending portion 14 of the housing 12 ensuring that the dressing device 10 is only actuated by further movement of the housing 12 with respect to the carriage member 38. Thus, the dressing device 10 can be mounted horizontally or vertically without affecting its operation or the actuation thereof.

Certain modifications and improvements will ocucr to those skilled in the art upon reading the foregoing. It should be understood that all such modifications and improvements have been deleted herein for the sake of conciseness and readability, but are properly within the scope of the following claims.

I claim:

1. A device for resurfacing welding electrode tips comprising a base member, a housing member operably connected to said base member and longitudinally movable with respect to said base member, drive means positioned within said device so that the longitudinal axis of said drive means is parallel to the direction of travel of said housing member relative to said base member, said drive means being an integral part of said housing member and being actuated by the longitudinal movement of said housing member with respect to said base member, and rotation means operably connected to said drive means, said rotation means being actuated in response to the actuation of said drive means.

2. A device for resurfacing welding electrode tips comprising a base member, a housing member operably connected to said base member and longitudinally movable with respect to said base member, said base member being normally positioned in the approximate longitudinal center of said housing member, drive means positioned within said device so that the longitudinal axis of said drive means is parallel to the direction of travel of said housing member relative to said base member, said drive means being actuated by the longitudinal movement of said housing member with respect to said base member, and rotation means operably connected to said drive means, said rotation means being actuated in response to the actuation of said drive means.

3. A device for resurfacing welding electrode tips comprising a base member, a housing member operably connected to said base member and longitudinally movable in either direction with respect to said base member, said base member being normally positioned in the approximate longitudinal center of said housing member, drive means positioned within said device so that the longitudinal axis of said drive means is parallel to the direction of travel of said housing member relative to said base member, said drive means being actuated by the longitudinal movement of said housing member with respect to said base member, and rotation means operably connected to said drive means, said rotation means being actuated in response to the actuation of said drive means.

4. A device for resurfacing welding electrode tips comprising a base member, a housing member operably connected to said base member and longitudinally movable with respect to said base member, said base member being normally positioned in the approximate longitudinal center of said housing member, means for biasing said member with respect to said housing member causing said base member to be normally positioned in said approximate longitudinal center of said housing member, drive means positioned within said device so that the longitudinal axis of said drive means is parallel to the direction of travel of said housing member relative to said base member, said drive means being actuated by the longitudinal movement of said housing member with respect to said base member, and rotation means operably connected to said drive means, said rotation means being actuated in response to the actuation of said drive means.

* * * * *